US008195720B2

(12) United States Patent
Hwang

(10) Patent No.: US 8,195,720 B2
(45) Date of Patent: Jun. 5, 2012

(54) DETECTING MEMORY LEAKS

(75) Inventor: Jinwoo Hwang, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 12/147,139

(22) Filed: Jun. 26, 2008

(65) Prior Publication Data

US 2008/0320449 A1    Dec. 25, 2008

Related U.S. Application Data

(63) Continuation of application No. 11/081,910, filed on Mar. 16, 2005, now abandoned.

(51) Int. Cl.
*G06F 12/00* (2006.01)
(52) U.S. Cl. ...................................................... 707/813
(58) Field of Classification Search .................. None
See application file for complete search history.

(56) References Cited

U.S. PATENT DOCUMENTS

| | | | |
|---|---|---|---|
| 5,822,593 A * | 10/1998 | Lamping et al. ............. 717/161 |
| 5,949,911 A * | 9/1999 | Chui et al. .................... 382/240 |
| 5,987,469 A * | 11/1999 | Lewis et al. ........................... 1/1 |
| 6,556,543 B1 * | 4/2003 | Park et al. ..................... 370/255 |
| 6,556,983 B1 * | 4/2003 | Altschuler et al. .............. 706/55 |
| 6,560,773 B1 * | 5/2003 | Alexander et al. ............ 717/128 |
| 6,829,222 B2 * | 12/2004 | Amis et al. .................... 370/238 |
| 6,986,117 B1 * | 1/2006 | Teig et al. ...................... 716/129 |
| 7,234,080 B2 * | 6/2007 | Cirne et al. .................. 714/38.12 |
| 7,487,308 B1 * | 2/2009 | Dalal et al. .................... 711/162 |
| 7,509,344 B1 * | 3/2009 | Kamvar et al. ....................... 1/1 |
| 7,953,763 B2 * | 5/2011 | Kamvar et al. ............... 707/802 |
| 2002/0018448 A1 * | 2/2002 | Amis et al. .................... 370/255 |
| 2004/0078540 A1 * | 4/2004 | Cirne et al. .................... 711/170 |
| 2004/0181562 A1 * | 9/2004 | Findeisen ..................... 707/206 |
| 2004/0181782 A1 * | 9/2004 | Findeisen ..................... 717/130 |
| 2009/0106289 A1 * | 4/2009 | Furusho ........................ 707/102 |
| 2009/0282081 A1 * | 11/2009 | Kamvar et al. ............ 707/104.1 |
| 2010/0211754 A1 * | 8/2010 | Crosby et al. ................. 711/170 |

OTHER PUBLICATIONS

Helena Ostlund, "Memory Leak Detection with the JRockit JVM," dated Feb. 11, 2005.*

* cited by examiner

*Primary Examiner* — Tim T Vo
*Assistant Examiner* — Hubert Cheung
(74) *Attorney, Agent, or Firm* — Cuenot, Forsythe & Kim, LLC

(57) ABSTRACT

Methods of detecting a memory leak may include identifying a largest ChildNode of a ParentNode, and comparing a total size of the ParentNode to a total size of the largest ChildNode of the ParentNode. If the total size of the ParentNode is significantly larger than the total size of the largest ChildNode of the ParentNode, a possible memory leak area may be identified. Related systems and computer program products are also discussed.

16 Claims, 5 Drawing Sheets

DETECTING MEMORY LEAKS

PRIORITY CLAIM

The present application is a continuation of U.S. patent application Ser. No. 11/081,910, titled, "Detecting Memory Leaks," filed on Mar. 16, 2005 now abandoned, the contents of which is incorporated herein by reference in its entirety.

BACKGROUND OF THE INVENTION

The present invention relates to data processing in general and, more particularly, to methods, systems, and computer program products for monitoring program code memory usage. Object oriented programming is a well-known software application development technique that employs collections of objects or discrete modular data structures that are identified by so called references. More than one reference can identify the same object. The references can be stored in the application variables and within the objects, forming a network of objects and references, known as the reference graph. The objects are created dynamically during the application execution, and are contained in a memory structure referred to as a heap.

Many object oriented programming languages, such as JAVA®, Eiffel, and C sharp C#), employ automatic memory management, popularly known as garbage collection. Automatic memory management is an active component of the runtime system associated with the implementation of the object oriented language, which removes unneeded objects from the heap during the application execution. An object is unneeded if the application will no longer use it during its execution. A common way of determining at least a substantial subset of the unneeded objects is to determine so called "liveness" of all objects in the heap. An object is defined as "live" if there exists a path of references starting from one of the application variables, and ending at the reference to the given object. A path of references is defined as a sequence of references in which each reference with the exception of the first reference in the sequence is contained within the object identified by the previous reference in the sequence.

A frequent problem appearing in object oriented applications written in languages with automatic memory management is that some objects due to the design or coding errors remain live, contrary to the programmer's intentions. Such objects are called lingering objects. Lingering objects tend to accumulate over time, clogging the heap and causing multiple performance problems, eventually leading to the application crash.

To detect the lingering objects, programmers in the development phase of the application life-cycle employ memory debugging or memory profiling tools. In one widely practiced debugging methodology, the tool produces a heap dump which serves as a baseline snapshot that illustrates the objects residing in the heap at the given time. A set of test inputs is then run through the program and the tool produces a second snapshot of the heap which illustrates the objects residing in the heap at the second time. The programmer then compares the two snapshots to determine which objects are accumulating over time. By analyzing the reference graphs contained in the heap dumps, and using his/her skills and the knowledge of the program logic, the programmer can determine which objects are lingering, and, what is even more important, why they stay alive. Then the programmer can proceed with fixing the application program in such a way that no more reference paths to the lingering objects can be found by the garbage collector. Despite the acceptance of existing approaches to finding lingering objects, they may be tedious to use, and may not easily scale in a production environment, where heap sizes can be of order of gigabytes.

U.S. Patent Publication No. 2004/0181782 discusses a system and method for optimizing memory usage by locating lingering objects. U.S. Pat. No. 6,167,535 discusses object heap analysis techniques for discovering memory leaks and other run time information. U.S. Pat. No. 6,694,507 discusses a method and apparatus for analyzing performance of object oriented programming code. U.S. Pat. No. 6,434,575 discusses a method of instrumenting garbage collection generating a trace file making a single pass analysis of object heap. The disclosures of U.S. Patent Publication No. 2004/0181782, U.S. Pat. No. 6,176,535, U.S. Pat. No. 6,694,507, and U.S. Pat. No. 6,434,575 are hereby incorporated herein in their entirety by reference.

Notwithstanding the systems and methods discussed above, there continues to exist a need for methods, systems, and computer program products providing monitoring of object oriented program code memory usage.

SUMMARY OF THE INVENTION

According to embodiments of the present invention, methods detecting a memory leak may include identifying a largest ChildNode of a ParentNode, and comparing a total size of the ParentNode to a total size of the largest ChildNode of the ParentNode. If the total size of the ParentNode is significantly larger than the total size of the largest ChildNode of the ParentNode, a possible memory leak area may be identified.

For example, comparing a total size of the ParentNode to a total size of the largest ChildNode may include calculating a difference between the total size of the ParentNode and the total size of the largest ChildNode. Accordingly, identifying a possible memory leak area may include identifying a possible memory leak area if the difference between the total size of the Parent Node and the total size of the largest ChildNode exceeds a difference threshold.

In an alternative, comparing a total size of the ParentNode to a total size of the largest ChildNode may include calculating a ratio of the total size of the largest ChildNode with respect to the total size of the ParentNode. Accordingly, identifying a possible memory leak area may include identifying a possible memory leak area if the ratio of the total size of the largest ChildNode with respect to the total size of the ParentNode is less than a ratio threshold.

In addition, if the total size of the ParentNode is not significantly larger than the total size of the largest ChildNode, a largest GrandChildNode may be identified. After identifying the largest GrandChildNode, a total size of the ChildNode may be compared to a total size of the largest GrandChildNode. If the total size of the ChildNode is significantly larger than the total size of the largest GrandChildNode, a possible memory leak area may be identified.

Moreover, if the total size of the ParentNode is not significantly larger than the total size of the largest ChildNode of the ParentNode, the total size of the ChildNode may be compared to a size threshold. If the total size of the ChildNode is less than the size threshold, a no memory leak detected result may be returned. If the total size of the ChildNode is greater than the size threshold, a largest GrandChildNode may be identified. After identifying the largest GrandChildNode, a total size of the ChildNode may be compared to a total size of the largest GrandChildNode, and if the total size of the ChildNode is significantly larger than the total size of the largest GrandChildNode, a possible memory leak area may be identified.

If the total size of the ParentNode is not significantly larger than the total size of the largest ChildNode, a determination may be made if the largest ChildNode is a terminal node. If the largest ChildNode is a terminal node, a no memory leak detected result may be returned. If the largest ChildNode is not a terminal node, a largest GrandChildNode may be identified. After identifying the largest GrandChildNode, a total size of the ChildNode may be compared to a total size of the largest GrandChildNode. If the total size of the ChildNode is significantly larger than the total size of the largest GrandChildNode, a possible memory leak area may be identified.

If the total size of the ParentNode is not significantly larger than the total size of the largest ChildNode, a determination may be made if the largest ChildNode is a terminal node. If the largest ChildNode is a terminal node, a no memory leak detected result may be returned. If the total size of the ParentNode is not significantly larger than the total size of the largest ChildNode, the total size of the ChildNode may be compared to a size threshold. If the total size of the ChildNode is less than the size threshold, a no memory leak detected result may be returned. If the ChildNode is not a terminal node and if the total size of the ChildNode is greater than the size threshold, a largest GrandChildNode may be identified. After identifying the largest GrandChildNode, a total size of the ChildNode may be compared to a total size of the largest GrandChildNode. If the total size of the ChildNode is significantly larger than the total size of the largest GrandChildNode, a possible memory leak area may be identified.

According to other embodiments of the present invention, a computer program product may be provided for detecting a memory leak. The computer program product may include a computer readable medium having computer readable program code embodied therein. More particularly, the computer readable program code may include computer readable program code configured to identify a largest ChildNode of a ParentNode, and computer readable program code configured to compare a total size of the ParentNode to a total size of the largest ChildNode of the ParentNode. Additional computer readable program code may be configured to identify a possible memory leak area if the total size of the ParentNode is significantly larger than the total size of the largest ChildNode of the ParentNode.

According to still other embodiments of the present invention, a system may be provided for detecting a memory leak. The system may include a processor configured to identify a largest ChildNode of a ParentNode, and to compare a total size of the ParentNode to a total size of the largest ChildNode of the ParentNode. The processor may be further configured to identify a possible memory leak area if the total size of the ParentNode is significantly larger than the total size of the largest ChildNode of the ParentNode.

DETAILED DESCRIPTION OF EMBODIMENTS OF THE INVENTION

Figure 1:
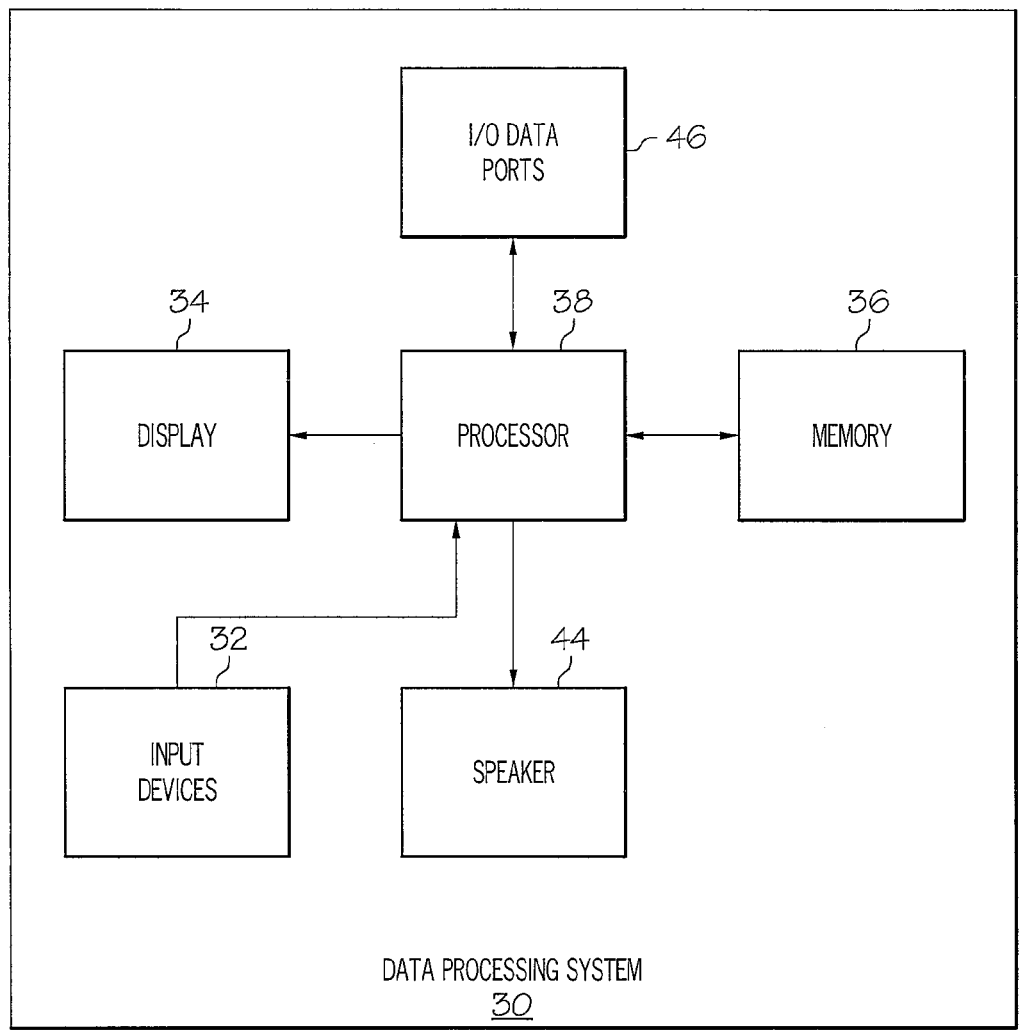
FIG. 1 is a block diagram of data processing systems according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as JAVA®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems and/or computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1 through 5. As described herein, some embodiments of the present invention provide methods of detecting a memory leak in an object oriented programming language code (such as JAVA® code) memory Heap Dump by identifying a largest ChildNode of a ParentNode in the memory Heap Dump, and comparing a size of the ParentNode to a size of the largest ChildNode of the ParentNode. If the size of the ParentNode is significantly larger than the size of the largest ChildNode, the ParentNode may be identified as a possible memory leak area. Otherwise, a largest GrandChildNode of the ChildNode may be identified, and a size of the ChildNode may be compared to a size of the largest GrandChildNode. If the size of the ChildNode is significantly larger than the size of the largest GrandChildNode, the ChildNode may be identified at a possible memory leak area. The analysis may continue through successive levels of the memory Heap Dump until either an object node is identified as a possible memory leak area, a size of subsequent object node is less than a threshold, or a terminal object node (also referred to as a leaf node) is reached.

As used herein, the term Node may refer to a memory object of a memory heap generated by an object oriented programming language such as JAVA®. More generally, the term node may also refer to a file or subdirectory. As used herein, a total size of a node/object may refer to a sum of a size of the node/object and sizes of all children of the node/object (i.e., a sum of a size of the node/object and a size of its sub-tree).

Referring now to FIG. 1, a block diagram of data processing systems suitable for use in systems according to some embodiments of the present invention will be discussed. As illustrated in FIG. 1, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicates with the processor 38. The I/O data ports 46 can be used to transfer information between the data processing system 30 and another computer system or a network. These components may be conventional components, such as those used in many conventional data processing systems, which may be configured to operate as described herein.

Figure 2:
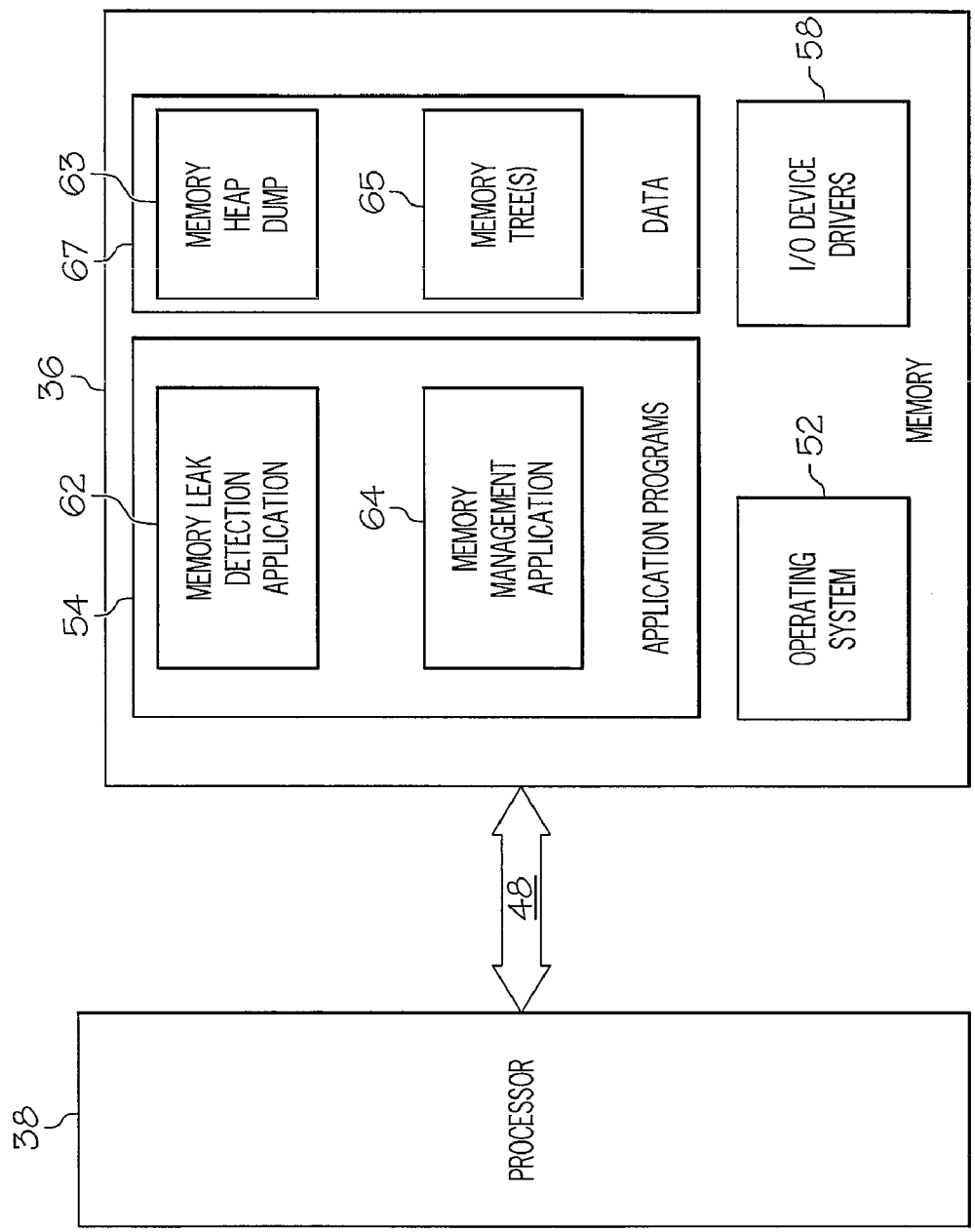
FIG. 2 is a more detailed block diagram of systems providing memory leak detection according to some embodiments of the present invention.

FIG. 2 is a block diagram of data processing systems that illustrate systems, methods, and/or computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM. Moreover, the processor 38 of FIG. 2 may be coupled to I/O data ports 46, display 34, input devices 32, and/or speaker 44 as discussed above with respect to FIG. 1.

As shown in FIG. 2, the memory 36 may include several categories of software and data used in the data processing system 30: an operating system 52; application programs 54; input/output (I/O) device drivers 58; and data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 67 represents the static and dynamic data used by the application programs 54, the operating system 52, the I/O device drivers 58, and other software programs that may reside in the memory 36.

Figure 5:
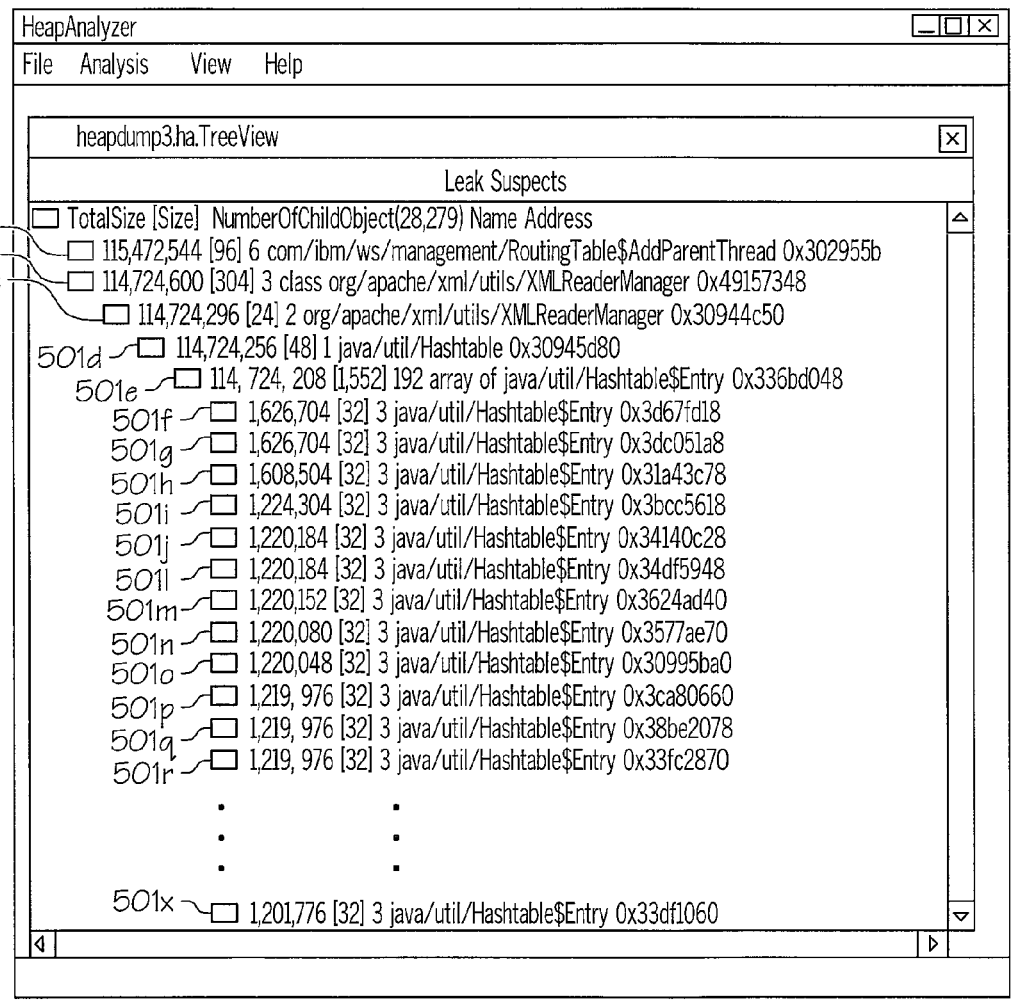
FIG. 5 is a memory tree according to some embodiments of the present invention.

As is further seen in FIG. 2, the application programs 54 may include at least one memory leak detection application 62 which may be provided as a part of and/or in addition to a memory management application 64. As used herein, the term memory leak detection application refers to any application that may provide detection of memory leak areas, for example, in a memory heap dump, such as a JAVA.RTM. memory heap dump. Such applications may include, for example, web pages, servlets, applets or the like. In particular embodiments of the present invention, the language independent application may be a JAVA.RTM. application. The memory management application 64, for example, may read a memory heap dump 63 file generated by object oriented programming application (such as a JAVA.RTM. application), parse each object of the memory heap dump; create graphs defining parent/child relationships based on the parsed information; and then create memory trees 65 based on the parsed information and the graphs. An example of a memory tree view according to embodiments of the present invention is illustrated in FIG. 5. The memory leak detection application 62 may then analyze the resulting memory tree(s) to locate possible memory leak locations.

While embodiments of the present invention are illustrated in FIGS. 1 and 2 with reference to particular divisions between application programs, data and the like, the present invention should not be construed as limited to configurations of FIGS. 1 and 2 but is intended to encompass any configuration capable of carrying out operations described herein.

According to embodiments of the present invention, a memory management application 64 may read a memory heap dump 63 file generated by another application program, and the memory heap dump file may include a list of all objects in the memory heap. The memory management application 64 may then parse information for each object of the memory heap dump file and create graphs defining parent/child relationships for objects of the memory heap dump file. The graphs may then be used to generate memory tree(s) 65.

An example of a memory tree 65 according to embodiments of the present invention is illustrated in FIG. 5. As shown in FIG. 5, a memory tree may identify a plurality of memory nodes 501a-x (also referred to as objects) arranged according to parent/child relationships. A ParentNode (also referred to as a parent object) is a node that holds at least one reference to at least one different node, and a child node (also referred to as a child object) is a node for which at least one different node holds a reference. A RootNode (also referred to as a root object) is a node for which no different node holds a reference.

In the example of FIG. 5, object 501a is a RootNode (root object), and node 501a is also a ParentNode (parentNode) with respect to object 501b. Object 501a may also be a ParentNode (parent object) with respect to other ChildNodes not shown in FIG. 5. Node 501b is a ChildNode with respect to node 501a and a ParentNode with respect to node 501c. Node 501c is a ChildNode with respect to node 501b and a ParentNode with respect to node 501d. Node 501d is a ChildNode with respect to node 501c and a ParentNode with respect to node 501e. Node 501e is a ChildNode with respect to node 501d and a ParentNode with respect to node 501f-x. Each of nodes 501f-x is a ChildNode with respect to node 501e, and each of nodes 501f-x maybe a ParentNode with respect to one or more nodes not shown in FIG. 5.

In the tree view of FIG. 5, the second field for each node identifies a size of that node with a size of a node being defined as an amount of memory that is used to store that node in memory. The first field for each node identifies a total size of the node with the total size being defined as a sum of a size of the node and all child nodes of that node. The third field for each node identifies a number of child nodes of that node, and the fourth field for each node identifies a name address for that node. By way of example, node 501a has a size of 96, a total size of 115,472,544, and 6 child nodes. Of the six child nodes of node 501a of FIG. 5, only one child node (node 501b) is illustrated in FIG. 5. Similarly, node 501e has a size of 48, a total size of 114,724,256, and 48 child nodes (nodes 501f-x).

Moreover, a node may have more ChildNodes than are illustrated in the tree view of FIG. 5. For example, node 501a has 6 child nodes of which only ChildNode 501b is shown; node 501b has 3 child nodes of which only ChildNode 501c is shown; and node 501c has 2 child nodes of which only ChildNode 501d is shown. In the tree view of FIG. 5, the nodes are sorted by total size with at least the largest ChildNode of each ParentNode being shown. Child nodes of less than a predetermined size may be omitted from the tree view of FIG. 5. While the tree view of FIG. 5 is provided for the sake of illustration, generation of such a tree view is not required according to embodiments of the present invention.

According to embodiments of the present invention, a method of detecting a memory leak may include identifying a largest ChildNode of a ParentNode, and comparing a total size of the ParentNode to a total size of the largest ChildNode of the ParentNode. If the total size of the ParentNode is significantly larger than the total size of the largest ChildNode of the ParentNode, the ParentNode may be identified as a possible memory leak area.

According to some embodiments, comparing total sizes of the ParentNode to the ChildNode may include calculating a difference between the size of the ParentNode and the size of the largest ChildNode. The ParentNode may be identified as a possible memory leak area if the difference between the size of the Parent Node and the size of the largest ChildNode exceeds a predetermined threshold. In the example of FIG. 5, a threshold difference of 10,000,000 between a ParentNode and a largest ChildNode could be used to determine if the ParentNode should be identified as a possible memory leak area. In alternatives, a threshold difference as low as 1,000,000 or as high as 100,000,000 could be used to determine if the ParentNode should be identified as a possible memory leak area.

According to other embodiments of the present invention comparing total sizes of the ParentNode and the ChildNode may include a calculating ratio of the largest ChildNode with respect to the ParentNode. The ParentNode may be identified as a possible memory leak area if the ratio of the largest ChildNode with respect to the ParentNode is less than a ratio threshold. In the example of FIG. 5, ratio threshold of 0.9 (i.e. largest ChildNode/ParentNode<0.9) could be used to determine if the ParentNode should be identified as a possible memory leak area. In alternatives, a ratio threshold as low as 0.1 (i.e. largest ChildNode/ParentNode<0.1) or as high as 0.99 (i.e. largest ChildNode/ParentNode<0.99) could be used to determine if the ParentNode should be identified as a possible memory leak area. As will be understood, an equivalent determination could be made using a ratio of the ParentNode with respect to the largest ChildNode (i.e. ParentNode/largestChildNode), such that the ParentNode is determined as a possible memory leak area if the ParentNode/largestChildNode ratio is greater than a ratio threshold (which is the inverse of the ratio thresholds discussed above, for example, 1.01, 1.11, or 10).

The comparisons may begin with a RootNode of a memory heap, such as RootNode 501a of FIG. 5, and proceed with a largest ChildNode in each successive generation until: (1) a largest Child Node of a next generation has a total size less than a predetermined threshold; (2) a largest ChildNode in a successive generation is a leaf Node (i.e. a terminal node with no ChildNodes); or (3) a ParentNode is identified as a possible memory leak area. Particular embodiments of the present invention will now be discussed in greater detail below with respect to flow charts of FIGS. 3 and 4 with reference to the tree view of FIG. 5.

Figure 3:
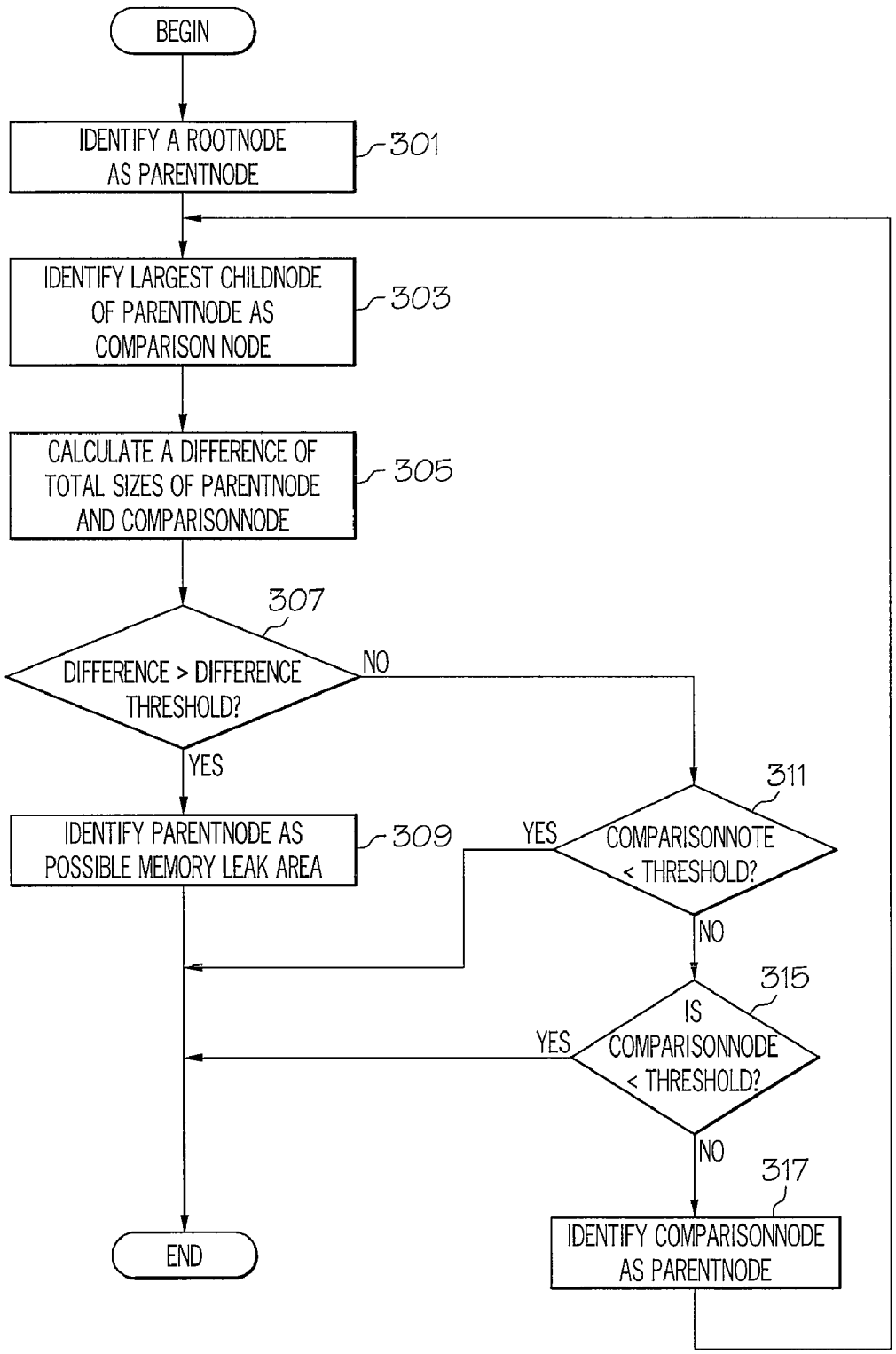
FIG. 3 is a is a flowchart illustrating operations for detecting memory leaks according to some embodiments of the present invention.

In embodiments of the present invention illustrated in the flow chart of FIG. 3, a RootNode (such as node 501a of FIG. 5) maybe identified as a ParentNode at block 301 in a first iteration, and a largest ChildNode of the ParentNode (such as node 501b of FIG. 5) may be identified as a comparison node at block 303. At blocks 305 and 307, total sizes of the ParentNode and the comparison node (e.g. the largest ChildNode of the ParentNode) may be compared to determine if the ParentNode should be identified as a possible memory leak area.

More particularly, a difference between the total size of the ParentNode and the total size of the comparison node (e.g. the largest ChildNode) may be calculated (e.g. totalsizeParentNode−totalsizeComparisonNode=difference) at block 305. If the difference between the total size of the ParentNode and the total size of the comparison node is greater than a difference threshold at block 307, the ParentNode may be identified as a possible memory leak area at block 309. As discussed above, the difference threshold in the example of FIG. 5 may be a predetermined memory value in the range of 100,000 to 10,000,000 such as 1,000,000. Other difference thresholds, however, may be used depending on the particular application. If the difference is not greater than the difference threshold at block 307, subsequent generations of the memory heap may be tested for possible memory leaks.

More particularly, if the ParentNode is not identified as a possible memory leak area, the total size of the comparison node (e.g. the largest ChildNode of the ParentNode) may be compared to a size threshold at block 311. If the total size of the comparison node is less than the size threshold at block 311, further memory leak detection operations may not be warranted, and memory leak operations may thus be terminated. Moreover, a no memory leak detected result may be returned. According to embodiments of the present invention illustrated in FIG. 3, the difference threshold of block 307 and the size threshold of block 311 may be the same or approximately the same because a difference between total sizes of the comparison node and a smaller node cannot exceed the difference threshold if a total size of the comparison node is less than the difference threshold.

If the total size of the comparison node is not less than the size threshold at block 311 and the comparison node is not a leaf node (also referred to as a terminal node) at block 315, the comparison node may be identified as a new ParentNode at block 317 and a next iteration of memory leak detection may proceed at blocks 303, 305, and 307 for a next generation of memory objects. In other words, a next iteration of memory leak detection may be performed with respect to the largest ChildNode (the new ParentNode) of the original ParentNode and a GrandChildNode of the original ParentNode. Accordingly, memory leak detection may be performed at each generation of nodes of a memory heap until: a possible memory leak area is identified; a ChildNode having a total size less than size threshold is reached; or a leaf node is reached.

With reference to FIGS. 3 and 5, a RootNode (such as node 501a) may be identified as a ParentNode at block 301, and a largest ChildNode (such as node 501b) of the ParentNode may be identified as a comparison node at block 303 during a first iteration of memory leak detection. A difference of total sizes of the ParentNode (node 501a) and the comparison node (node 501b) maybe calculated (e.g. 115,472,544−114,724,600=747,944) at block 305, and the difference (e.g. 747,944) may be compared to a difference threshold (e.g. 1,000,000). With a difference (e.g. 747,944) less than a difference threshold (e.g. 1,000,000) at block 307, the ParentNode (e.g. the RootNode or node 501a) is not identified as a possible memory leak area. The comparison node (node 501b) also exceeds the size threshold at block 311, and the comparison node (node 501b) is not a leaf node at block 315. Accordingly, the comparison node (node 501b) is identified as a Parent Node for a second iteration of memory leak detection.

During the second iteration of memory leak detection, the node 501b may be identified as the ParentNode, and a largest ChildNode (such as node 501c) of the ParentNode may be identified as a comparison node at block 303. In other words, a largest ChildNode (node 501b) and GrandChildNode (node 501c) of the RootNode (the original ParentNode) may be respectively designated as the ParentNode and comparison node during the second iteration of memory leak detection. A difference of total sizes of the ParentNode (node 501b) and the comparison node (node 501c) may be calculated (e.g. 114,724,600−114,724,296=304) at block 305, and the difference (e.g. 304) may be compared to the difference threshold (e.g. 1,000,000). With a difference (e.g. 304) less than the difference threshold (e.g. 1,000,000) at block 307, the ParentNode (e.g. the node 501b) is not identified as a possible memory leak area. The comparison node (node 501c) also exceeds the size threshold at block 311, and the comparison node (node 501c) is not a leaf node at block 315. Accordingly, the comparison node (node 501c) is identified as a Parent Node for a third iteration of memory leak detection.

During the third iteration of memory leak detection, the node 501c may be identified as the ParentNode, and a largest ChildNode (such as node 501d) of the ParentNode may be identified as a comparison node at block 303. In other words, a largest ChildNode (node 501c) and GrandChildNode (node 501d) of the previous ParentNode (node 501b) may be respectively designated as the ParentNode and comparison node during the third iteration of memory leak detection. A difference of total sizes of the ParentNode (node 501c) and the comparison node (node 501d) maybe calculated (e.g. 114,724,296−114,724,256=40) at block 305, and the difference (e.g. 40) may be compared to the difference threshold (e.g. 1,000,000). With a difference (e.g. 40) less than the difference threshold (e.g. 1,000,000) at block 307, the ParentNode (node 501c) is not identified as a possible memory leak area. The comparison node (node 501d) also exceeds the size threshold at block 311, and the comparison node (node 501d) is not a leaf node at block 315. Accordingly, the comparison node (node 501d) is identified as a Parent Node for a fourth iteration of memory leak detection.

During the fourth iteration of memory leak detection, the node 501d may be identified as the ParentNode, and a largest ChildNode (such as node 501e) of the ParentNode may be identified as a comparison node at block 303. In other words, a largest ChildNode (node 501d) and GrandChildNode (node 501e) of the previous ParentNode (node 501c) may be respectively designated as the ParentNode and comparison node during the fourth iteration of memory leak detection. A difference of total sizes of the ParentNode (node 501d) and the comparison node (node 501e) may be calculated (e.g. 114,724,256−114,724,208=48) at block 305, and the difference (e.g. 48) may be compared to the difference threshold (e.g. 1,000,000). With a difference (e.g. 48) less than the difference threshold (e.g. 1,000,000) at block 307, the ParentNode (node 501d) is not identified as a possible memory leak area. The comparison node (node 501e) also exceeds the size threshold at block 311, and the comparison node (node 501e) is not a leaf node at block 315. Accordingly, the comparison node (node 501e) is identified as a Parent Node for a fifth iteration of memory leak detection.

During the fifth iteration of memory leak detection, the node 501e may be identified as the ParentNode, and a largest ChildNode (such as node 501f) of the ParentNode may be identified as a comparison node at block 303. In other words, a largest ChildNode (node 501e) and GrandChildNode (node 501f) of the previous ParentNode (node 501d) may be respectively designated as the ParentNode and comparison node during the fifth iteration of memory leak detection. A difference of total sizes of the ParentNode (node 501e) and the comparison node (node 501f) may be calculated (e.g. 114,724,208−1,626,704=113,097,504) at block 305, and the difference (e.g. 113,097,504) may be compared to the difference threshold (e.g. 1,000,000). With a difference (e.g. 113,097,504) greater than the difference threshold (e.g. 1,000,000) at block 307, the ParentNode (node 501e) may be identified as a possible memory leak area. Memory leak detection operations may then be terminated with the result that node 501e is identified as a possible memory leak area.

In additional embodiments of the present invention, multiple largest ChildNodes of the ParentNode may be identified as ComparisonNodes at block 303. More particularly, each ChildNode having a total size greater than a size threshold may be identified as a Comparison Node. At block 307, a difference between a total size of each ComparisonNode and a total size of the ParentNode may be compared with the difference threshold. If a difference between a total size of any of the ComparisonNodes and the Parent Node is greater than the difference threshold, the ParentNode may be identified as a possible memory leak area at block 309. If none of differences exceed the difference threshold at block 307, then each of the ComparisonNodes may be compared to the threshold of block 311 and a determination may be made if any of the ComparisonNodes is a leaf node at block 315. A plurality of ComparisonNodes may thus be identified as ParentNodes at block 317, and operations of blocks 303, 305, and 307 may thus be performed with respect to a plurality of ComparisonNodes of the previous iteration.

Accordingly, memory leak detection operations may proceed in serial and/or parallel with respect to multiple ChildNodes at one or more generations of a memory heap dump. Moreover, operations of block 311 may be omitted if a suitable size threshold is used to identify ComparisonNodes at block 303.

Figure 4:
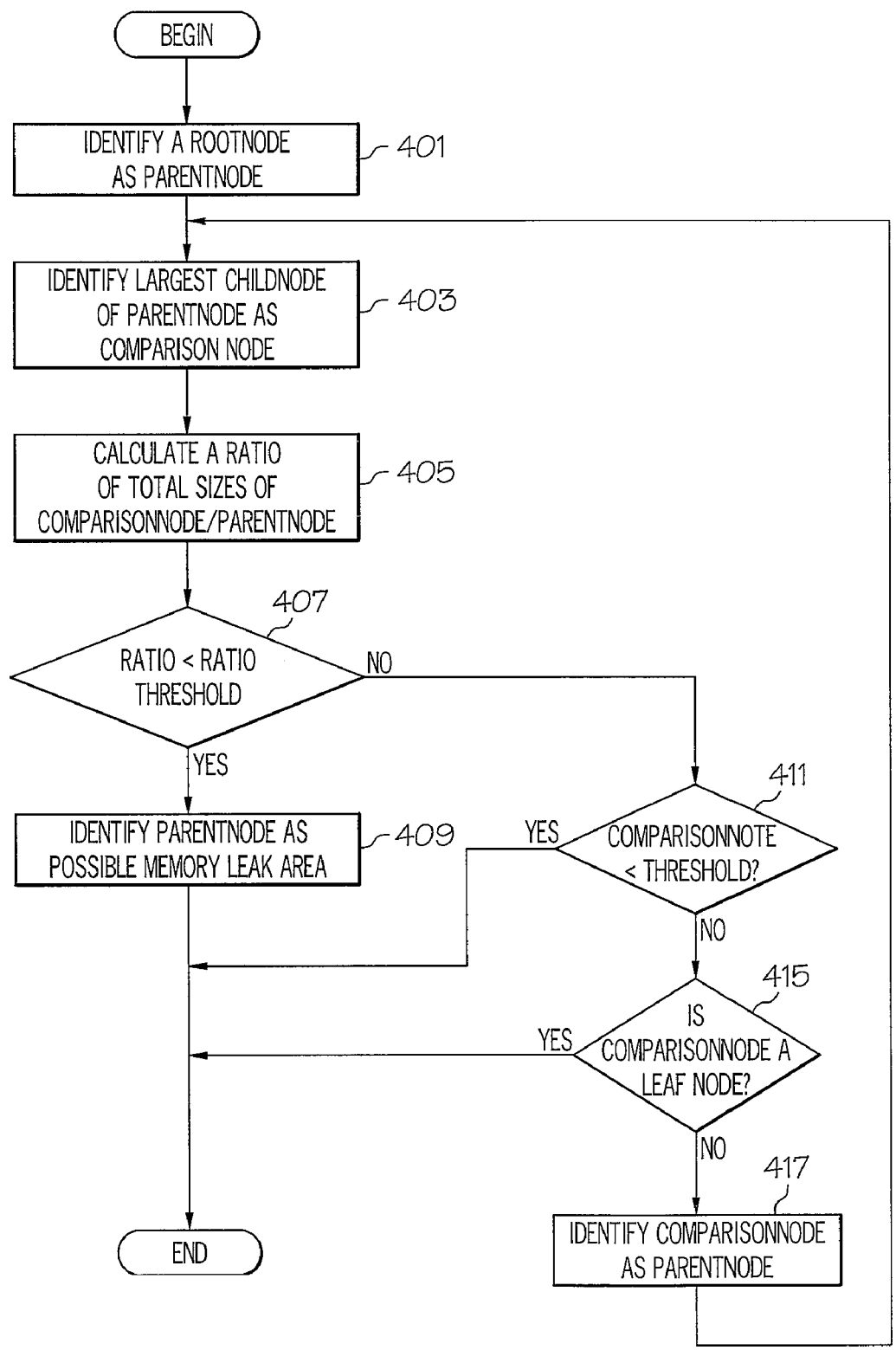
FIG. 4 is a is a flowchart illustrating operations for detecting memory leaks according to further embodiments of the present invention.

In embodiments of the present invention illustrated in the flow chart of FIG. 4, a RootNode (such as node 501a of FIG. 5) may be identified as a ParentNode at block 401 in a first iteration, and a largest ChildNode of the ParentNode (such as node 501b of FIG. 5) may be identified as a comparison node at block 403. At blocks 405 and 407, total sizes of the ParentNode and the comparison node (e.g. the largest ChildNode of the ParentNode) may be compared to determine if the ParentNode should be identified as a possible memory leak area.

More particularly, a ratio of the total sizes of the ParentNode and the comparison node (e.g. the largest ChildNode) may be calculated (e.g. totalsizeParentNode/totalsizeComparisonNode=ratio) at block 405. If the ratio of the total sizes of the ParentNode and the comparison node is less than a ratio threshold at block 407, the ParentNode may be identified as a possible memory leak area at block 409. As discussed above, the ratio threshold in the example of FIG. 5 may be a predetermined ratio value in the range of 0.1 to 0.99 such as 0.9. Other ratio thresholds, however, may be used depending on the particular application. If the ratio is not greater than the ratio threshold at block 407, subsequent generations of the memory heap may be tested for possible memory leaks.

More particularly, if the ParentNode is not identified as a possible memory leak area, the total size of the comparison node (e.g. the largest ChildNode of the ParentNode) may be compared to a size threshold at block 411. By way of example, the size threshold may be a predetermined threshold in the range of 100,000 to 10,000,000. If the total size of the comparison node is less than the size threshold at block 411, further memory leak detection operations may not be warranted, and memory leak operations may thus be terminated. Moreover, a no memory leak detected result may be returned.

If the total size of the comparison node is not less than the size threshold at block 411 and the comparison node is not a leaf node (also referred to as a terminal node) at block 415, the comparison node may be identified as a new ParentNode at block 417 and a next iteration of memory leak detection may proceed at blocks 403, 405, and 407 for a next generation of memory objects. In other words, a next iteration of memory leak detection may be performed with respect to the largest ChildNode (the new ParentNode) of the original ParentNode and a GrandChildNode of the original ParentNode. Accordingly, memory leak detection may be performed at each generation of nodes of a memory heap until: a possible memory leak area is identified; a ChildNode having a total size less than size threshold is reached; or a leaf node is reached.

With reference to FIGS. 4 and 5, a RootNode (such as node 501a) may be identified as a ParentNode at block 401, and a largest ChildNode (such as node 501b) of the ParentNode may be identified as a comparison node at block 403 during a first iteration of memory leak detection. A ratio of total sizes of the comparison node (node 501b) with respect to the ParentNode (node 501a) may be calculated (e.g. 114,724,600 ☐ 115,472,544=0.999) at block 405, and the ratio (e.g. 0.999) may be compared to a ratio threshold (e.g. 0.90). With a ratio (e.g. 0.999) greater than a ratio threshold (e.g. 0.90) at block 407, the ParentNode (e.g. the RootNode or node 501a) is not identified as a possible memory leak area. The comparison node (node 501b) also exceeds the size threshold at block 411, and the comparison node (node 501b) is not a leaf node at block 415. Accordingly, the comparison node (node 501b) is identified as a ParentNode for a second iteration of memory leak detection.

During the second iteration of memory leak detection, the node 501b may be identified as the ParentNode, and a largest ChildNode (such as node 501c) of the ParentNode may be identified as a comparison node at block 403. In other words, a largest ChildNode (node 501b) and GrandChildNode (node 501c) of the RootNode (the original ParentNode) may be respectively designated as the ParentNode and comparison node during the second iteration of memory leak detection. A ratio of total sizes of the comparison node (node 501c) with respect to the ParentNode (node 501b) may be calculated (e.g. 114,724,296 ☐ 114,724,600=0.999) at block 405, and the ratio (e.g. 0.999) may be compared to the ratio threshold (e.g. 0.90). With a ratio (e.g. 0.999) greater than the ratio threshold (e.g. 0.90) at block 407, the ParentNode (e.g. the node 501b) is not identified as a possible memory leak area. The comparison node (node 501c) also exceeds the size threshold at block 411, and the comparison node (node 501c) is not a leaf node at block 415. Accordingly, the comparison node (node 501c) is identified as a Parent Node for a third iteration of memory leak detection.

During the third iteration of memory leak detection, the node 501c may be identified as the ParentNode, and a largest ChildNode (such as node 501d) of the ParentNode may be identified as a comparison node at block 403. In other words, a largest ChildNode (node 501c) and GrandChildNode (node 501d) of the previous ParentNode (node 501b) may be respectively designated as the ParentNode and comparison node during the third iteration of memory leak detection. A ratio of total sizes of the comparison node (node 501d) with respect to the Parent Node (node 501c) may be calculated (e.g. 114,724,256 ☐ 114,724,296=0.999) at block 405, and the ratio (e.g. 0.999) may be compared to the ratio threshold (e.g. 0.90). With a ratio (e.g. 0.999) greater than the ratio threshold (e.g. 0.90) at block 407, the ParentNode (node 501c) is not identified as a possible memory leak area. The comparison node (node 501d) also exceeds the size threshold at block 411, and the comparison node (node 501d) is not a leaf node at block 415. Accordingly, the comparison node (node 501d) is identified as a Parent Node for a fourth iteration of memory leak detection.

During the fourth iteration of memory leak detection, the node 501d may be identified as the ParentNode, and a largest ChildNode (such as node 501e) of the ParentNode may be identified as a comparison node at block 403. In other words, a largest ChildNode (node 501d) and GrandChildNode (node 501e) of the previous ParentNode (node 501c) may be respectively designated as the ParentNode and comparison node during the fourth iteration of memory leak detection. A ratio of total sizes of the comparison node (node 501*e*) with respect to the ParentNode (node 501*d*) may be calculated (e.g. 114, 724,208 ☐ 114,724,256=0.999) at block 405, and the ratio (e.g. 0.999) may be compared to the ratio threshold (e.g. 0.90). With a ratio (e.g. 0.999) greater than the ratio threshold (e.g. 0.90) at block 407, the ParentNode (node 501*d*) is not identified as a possible memory leak area. The comparison node (node 501*e*) also exceeds the size threshold at block 411, and the comparison node (node 501*e*) is not a leaf node at block 415. Accordingly, the comparison node (node 501*e*) is identified as a Parent Node for a fifth iteration of memory leak detection.

During the fifth iteration of memory leak detection, the node 501*e* may be identified as the ParentNode, and a largest ChildNode (such as node 501*f*) of the ParentNode may be identified as a comparison node at block 403. In other words, a largest ChildNode (node 501*e*) and GrandChildNode (node 501*f*) of the previous ParentNode (node 501*d*) may be respectively designated as the ParentNode and comparison node during the fifth iteration of memory leak detection. A ratio of total sizes of the comparison node (node 501*f*) with respect to the ParentNode (node 501*e*) may be calculated (e.g. 1,626, 704 ☐ 114,724,208=0.014) at block 405, and the ratio (e.g. 0.014) may be compared to the ratio threshold (e.g. 0.90). With a ratio (e.g. 0.014) less than the ratio threshold (e.g. 0.90) at block 407, the ParentNode (node 501*e*) may be identified as a possible memory leak area at block 409. Memory leak detection operations may then be terminated with the result that node 501*e* is identified as a possible memory leak area.

In additional embodiments of the present invention, multiple largest ChildNodes of the ParentNode may be identified as ComparisonNodes at block 403. More particularly, each ChildNode having a total size greater than a size threshold may be identified as a Comparison Node. At block 407, a ratio of a total size of each ComparisonNode with respect to a total size of the ParentNode may be compared with the ratio threshold. If a ratio of a total size of any of the ComparisonNodes with respect to the Parent Node is greater than the ratio threshold, the ParentNode may be identified as a possible memory leak area at block 409. If none of ratios exceed the ratio threshold at block 407, then each of the ComparisonNodes may be compared to the threshold of block 411 and a determination may be made if any of the ComparisonNodes is a leaf node at block 415. A plurality of ComparisonNodes may thus be identified as ParentNodes at block 417 for a next iteration, and operations of blocks 403, 405, and 407 may thus be performed with respect to a plurality of ComparisonNodes of the previous iteration.

Accordingly, memory leak detection operations may proceed in serial and/or parallel with respect to multiple ChildNodes at one or more generations of a memory heap dump. Moreover, operations of block 411 may be omitted if a suitable size threshold is used to identify ComparisonNodes at block 403.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A computer program product comprising a computer usable storage medium having stored therein computer usable program code for detecting a memory leak, the computer usable program code, which when executed by a computer hardware system, causes the computer hardware system to perform:
   identifying a ChildNode of a ParentNode as a largest ChildNode of the ParentNode based on memory size;
   generating a comparison value based upon a comparison between a total memory size of the ParentNode and a total memory size of the identified largest ChildNode of the ParentNode; and
   identifying a possible memory leak area based upon the generated comparison value.

2. The computer program product according to claim 1, wherein
   the comparison value is based upon a difference between the total memory size of the ParentNode and the total memory size of the identified largest ChildNode; and
   the possible memory leak area is identified upon the comparison value exceeding a difference threshold.

3. The computer program product according to claim 1, wherein
   the comparison value is based upon a ratio of the total memory size of the identified largest ChildNode to the total memory size of the ParentNode; and
   the possible memory leak area is identified upon the comparison value being less than a ratio threshold.

4. The computer program product according to claim 1, wherein the computer usable program code further causes the computer hardware system to perform:
   identifying a GrandChildNode of the ParentNode as a largest GrandChildNode of the ParentNode based on memory size;
   generating a second comparison value based upon the total memory size of the identified largest ChildNode and a total memory size of the identified largest GrandChildNode; and
   identifying a second possible memory leak area based upon the generated second comparison value.

5. The computer program product according to claim 1, wherein the computer usable program code further causes the computer hardware system to perform:
   comparing the total memory size of the identified largest ChildNode to a size threshold;
   returning a no memory leak detected result upon the total memory size of the identified largest ChildNode being less than the size threshold;
   identifying a GrandChildNode of the ParentNode as a largest GrandChildNode of the ParentNode based on memory size upon the total memory size of the identified largest ChildNode being greater than the size threshold;
   generating a second comparison value based upon the total memory size of the identified largest ChildNode and a total memory size of the identified largest GrandChildNode; and
   identifying a second possible memory leak area based upon the generated second comparison value.

6. The computer program product according to claim 1, wherein the computer usable program code further causes the computer hardware system to perform:
   determining whether the identified largest ChildNode is a terminal node;

returning a no memory leak detected result upon the identified largest ChildNode being the terminal node;
identifying a GrandChildNode of the ParentNode as a largest GrandChildNode of the ParentNode based on memory size upon the identified largest ChildNode not being the terminal node;
generating a second comparison value based upon the total memory size of the identified largest ChildNode and a total memory size of the identified largest GrandChildNode; and
identifying a second possible memory leak area based upon the generated second comparison value.

7. The computer program product according to claim 1, wherein the computer usable program code further causes the computer hardware system to perform:
determining whether the identified largest ChildNode is a terminal node;
returning a no memory leak detected result upon the identified largest ChildNode being the terminal node;
comparing the total memory size of the identified largest ChildNode to a size threshold upon the total memory size of the ParentNode not being significantly larger than the total memory size of the identified largest ChildNode;
returning a no memory leak detected result upon the total memory size of the identified largest ChildNode being less than the size threshold;
identifying a GrandChildNode of the ParentNode as a largest GrandChildNode of the ParentNode based on memory size upon the identified largest ChildNode not being the terminal node and upon the total memory size of the identified largest ChildNode being greater than the size threshold;
generating a second comparison value based upon the total memory size of the identified largest ChildNode and a total memory size of the identified largest GrandChildNode; and
identifying a second possible memory leak area based upon the generated second comparison value.

8. A computer hardware system for detecting a memory leak, comprising:
a processor configured to:
identify a ChildNode of a ParentNode as a largest ChildNode of the ParentNode based on memory size;
generate a comparison value based upon a comparison between a total memory size of the ParentNode and a total memory size of the identified largest ChildNode of the ParentNode; and
identify a possible memory leak area based upon the generated comparison value.

9. The computer hardware system according to claim 8, wherein
the comparison value is based upon a difference between the total memory size of the ParentNode and the total memory size of the identified largest ChildNode; and
the possible memory leak area is identified upon the comparison value exceeding a difference threshold.

10. The computer hardware system according to claim 8, wherein
the comparison value is based upon a ratio of the total memory size of the identified largest ChildNode with respect to the total memory size of the ParentNode; and
the possible memory leak area is identified upon the comparison value being less than a ratio threshold.

11. The computer hardware system according to claim 8, wherein the processor is further configured to:
identify a GrandChildNode of the ParentNode as a largest GrandChildNode of the ParentNode based on memory size;
generate a second comparison value based upon the total memory size of the identified largest ChildNode and a total memory size of the identified largest GrandChildNode; and
identifying a second possible memory leak area based upon the generated second comparison value.

12. The computer hardware system according to claim 8, wherein the processor is further configured to:
compare the total memory size of the identified largest ChildNode to a size threshold;
returning a no memory leak detected result upon the total memory size of the identified largest ChildNode being less than the size threshold;
identify a GrandChildNode of the ParentNode as a largest GrandChildNode of the ParentNode based on memory size upon the total memory size of the identified largest ChildNode being greater than the size threshold;
generate a second comparison value based upon the total memory size of the identified largest ChildNode to a total memory size of the identified largest GrandChildNode; and
identify a second possible memory leak area based upon the generated second comparison value.

13. The computer hardware system according to claim 8, wherein the processor is further configured to:
determine whether the identified largest ChildNode is a terminal node;
return a no memory leak detected result upon the identified largest ChildNode being the terminal node;
identify a GrandChildNode of the ParentNode as a largest GrandChildNode of the ParentNode based on memory size upon the identified largest ChildNode not being the terminal node;
generate a second comparison value based upon the total memory size of the identified largest ChildNode to a total memory size of the identified largest GrandChildNode; and
identify a second possible memory leak area based upon the generated second comparison value.

14. A computer-implemented method for detecting a memory leak, comprising:
identifying a ChildNode of a ParentNode as a largest ChildNode of the ParentNode based on memory size;
generating a comparison value based upon a comparison between a total memory size of the ParentNode and a total memory size of the identified largest ChildNode of the ParentNode; and
identifying a possible memory leak area based upon the generated comparison value.

15. The computer-implemented method according to claim 14, wherein
the comparison value is based upon a difference between the total memory size of the ParentNode and the total memory size of the identified largest ChildNode; and
the possible memory leak area is identified upon the comparison value exceeding a difference threshold.

16. The computer-implemented method according to claim 14, wherein
the comparison value is based upon a ratio of the total memory size of the identified largest ChildNode to the total memory size of the ParentNode; and
the possible memory leak area is identified upon the comparison value being less than a ratio threshold.

* * * * *